June 7, 1955
W. A. STONE
2,710,156
AUTOMATIC PILOTS
Filed March 16, 1949
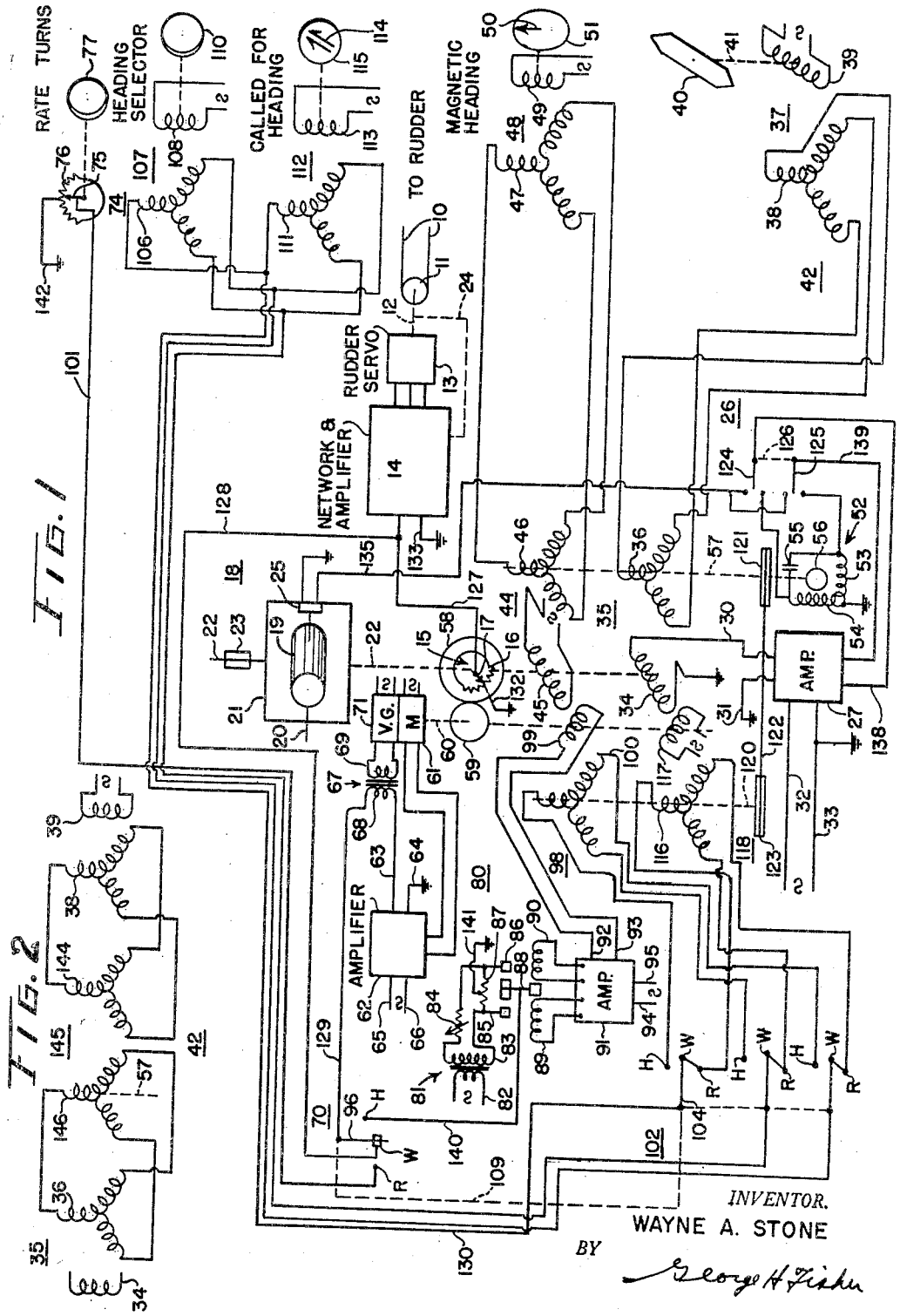
INVENTOR.
WAYNE A. STONE
BY
George H. Fisher
ATTORNEY United States Patent Office 2,710,156
Patented June 7, 1955

2,710,156

AUTOMATIC PILOTS

Wayne A. Stone, St. Louis Park, Minn., assignor to Minneapolis-Honeywell Regulator Company, Minneapolis, Minn., a corporation of Delaware Application March 16, 1949, Serial No. 81,795

15 Claims. (Cl. 244—77)

This invention pertains to steering mechanisms for dirigible craft such as aircraft, watercraft, and the like and more directly relates to steering mechanisms for an aircraft which are commonly known as automatic pilots.

Such automatic pilots are conventionally provided with a directional gyroscope as a directional stabilizer. In many instances the gyroscope may wander due to its inherent bearing friction and thus detract from its utility as a stabilizer; therefore, a magnet compass is used in some instances as a supplementary steering device. By using the magnetic compass as a guide, the gyro stabilized course may be reset by caging the gyroscope and returning the craft to the course, following which the gyroscope is uncaged and again assumes directional stabilization.

Oftentimes, the gyroscope is slaved to a magnetic compass to prevent the gyroscope from wandering. If the gyroscope is slaved to the compass by precessing it on deviation of the gyroscope from the compass, the precession rate of the gyroscope is held to a low value in order that the gyroscope will be insensitive to oscillations of the compass but will be precessed on steady deviations of the gyroscope and compass. This precessing means may be controlled by signals from a resolver or differential means responsive to the relative positions of the gyroscope and compass.

When the automatic pilot is being "warmed up," there may be considerable deviation of the gyroscope and compass; consequently with the low rate of precession available, considerable time would be required to eliminate the deviation or to align the gyroscope and compass when the resolver is in a no signal condition, prior to initiating gyroscope stabilization.

It is an object of this invention to provide novel means for reducing the time required to thus condition the resolver with reference to the compass and gyroscope before gyroscope directional control may be imposed on a craft.

It is a further object of this invention to adjust the resolver to a no signal condition on "warming up" at a faster rate than can be obtained from precessing the gyroscope.

It is a further object of this invention to use auxiliary means responsive to control signals from the resolver to thus condition the resolver by adjusting a normally fixed part of said resolver.

It is a further object of this invention to provide selective means so that said resolver controls said gyroscope precessing means or said auxiliary means.

It is a further object of this invention to operate a magnetic heading indicator upon operation of said resolver by either movement of said gyroscope or said auxiliary means.

It is a further object of this invention to provide selective means for altering the direction of flight of the aircraft which on "warming up" are adjusted to correspond with said magnetic heading indicator.

These and further objects of this invention will more fully appear upon consideration of the following description and drawing of two structures embodying the invention.

Referring to the drawing which will be referred to in connection with a detailed description of the invention, Figure 1 is a schematic arrangement of an automatic pilot wherein the resolver parts are physically positioned to a desired condition, and Figure 2 is a schematic showing of a portion of a modified arrangement wherein said condition of said resolver is obtained without physical adjustment of said resolver.

Referring to Figure 1 which should be considered in connection with the following detailed description, a rudder (not shown) is operated from cables 10 extending from a cable drum 11 carried on a shaft 12 driven by a rudder servomotor 13. The rudder servomotor is reversibly controlled by a balanceable potentiometer network and A. C. discriminator amplifier arrangement 14. Included in the network arrangement 14 is a gyroscope operated pick-off or potentiometer 15 consisting of a resistor 16 and a slider 17. The servomotor and network amplifier arrangement is similar to that disclosed in the patent to Willis H. Gille et al., 2,425,734. The distinction between the arrangement here and that of the patent is in the substitution of the gyroscope pick-off 15 of the present arrangement for the gyroscope operated potentiometer 14 shown in Figure 2 of the patent. The slider 17 of potentiometer 15 is stabilized as of old by a directional gyroscope 18 but the resistor 16 of potentiometer 15 is operated by novel means to be described.

The directional gyroscope 18, as conventional, includes a casing 19 which supports for rotation about a horizontal axis a rotor (not shown). The casing 19 is carried by trunnions 20 in a vertical gimbal ring 21 on a horizontal axis at right angles to the spin axis of the rotor. The gimbal ring 21 in turn has trunnions 22 which are carried in bearings 23 (only one of which is shown) for rotation about a vertical axis. The lower trunnion 22 is extended and carries the slider 17 of potentiometer 15. The gyroscope 18 is provided with a precession motor 25 for effecting rotation of the gyroscope in bearings 23. The motor 25 or torque applying means may be of the two-phase induction type. The motor includes a rotor (not shown) which is carried on a trunnion 20 and the stator field windings which are carried by the gimbal 21. The precession motor may be an induction motor of the split-phase capacitor type similar to that shown in Keeler Patent 2,272,914, dated February 10, 1942.

The precession motor 25 is controlled through a double-pole double-throw switch 26 from a compass amplifier 27. The amplifier 27 includes A. C. signal input leads 30, 31 and A. C. power input leads 32, 33 connected to the ship's supply. The amplifier 27 includes a pair of relays (not shown) which are alternatively operated depending upon the phase relationship between the voltage across the signal input leads 30, 31, and that across the power input leads 32, 33. When one relay is operated a rotating field is set up in one direction by the stator windings of precession motor 25 and when the other relay is operated a rotating field is set up in the opposite direction. An example of a capacitor type induction motor whose field rotates in one or the other direction in response to operation of one or another relays which relays in turn are operated from an amplifier in accordance with the phase relationship of an input control signal to the amplifier as compared with the line voltage supply to the amplifier shown in the aforesaid patent to Keeler, 2,272,914.

The signal input leads 30, 31 are connected to the single-phase winding 34 of a synchro transformer 35. The synchro transformer 35 includes a stator 36 having a three-phase winding. The single-phase winding 34 is carried on the lower trunnion 22 of directional gyroscope 18. The three windings of stator 36 of transformer 35 are connected to corresponding three windings of a stator 38 of a synchro generator 37. The synchro generator 37 includes a single-phase winding 39 which is energized from the ship's A. C. supply. The single-phase winding 39 is positioned in accordance with the movements of a compass needle 40 through a suitable operating connection 41.

The synchro generator 37 and the synchro transformer 35 together constitute a differential means or resolver 42.

Also carried by the lower trunnion 22 of gyroscope 18 is a single-phase winding 45 of a synchro generator 44. The generator 44 includes a stator 46 having a three-phase winding which is connected to the corresponding three-phase windings of a stator 47 of a synchro receiver 48. The receiver 48 has a single-phase winding 49 which is energized from the ship's A. C. supply. The receiver or motor 48 has a pointer 50 connected to its single-phase winding 49 and positioned thereby. The pointer 50 coacts with a suitable dial 51 for purposes of indicating the magnetic heading of the craft.

The stator 46 of generator 44 and the stator 36 of the signal transformer 35 are operatively driven by an auxiliary motor 52. The motor 52 may be of the capacitor type having stator windings 53 and 54. The windings have a common end junction connected to ground and the other ends shunted by a condenser 55 which other ends are separately connected to separate contacts of switch 26. The windings 53 and 54 are energized through the double-pole double-throw switch 26 from the compass amplifier 27 to set up a rotating field whose direction depends upon the operation of the relays (not shown) in amplifier 27 and the consequent energization of one or the other of the switch contacts. The motor 52 may thus be similar to the torque applying means 25 which forms the precession motor for gyroscope 18. The motor 52 includes a rotor 56 which drives the shaft 57 upon which the stator windings 46 and 36 are supported.

The resistor 16 which constitutes part of the directional gyro pick-off 15 is energized through a transformer (not shown) from the ship's supply and is carried by a gear 58 which is in mesh with a driving gear 59. Gear 59 is fixed to a shaft 60 driven by a motor 61 for the purpose of changing heading of the craft.

The motor 61 may be of the capacitor type having one stator winding directly energized from the A. C. ship's supply and having its other phase winding energized from the output of an amplifier 62. The amplifier is supplied with an A. C. control signal voltage across leads 63, 64 and is connected to the A. C. ship's supply by leads 65 and 66. The direction of rotation of the motor 61 depends upon the phase relationship of the voltage across the signal input leads 63, 64 with respect to the voltage across the supply leads 65, 66. The amplifier-motor combination may be similar to that disclosed in the patent to Upton, 2,423,534 wherein an A. C. discriminator amplifier controls the direction of rotation of a capacitor motor similar as in the present instance.

The input circuit of amplifier 62 in one instance comprises input lead 63, a secondary winding 68 of a transformer 67, switch arm 96 and an R contact of a single-pole three position switch 70, a lead 101, a rate turn potentiometer 74, lead 152 and grounded lead 64 of amplifier 62.

The potentiometer 74 includes a slider 75 and a resistor 76. The resistor 76 is energized through a transformer means (not shown) from the ship's supply. The slider 75 is selectively positioned by a manually operable rate turn knob 77.

The transformer 67 includes a primary winding 69 which is energized by the output winding of a motor driven velocity signal generator 71. The velocity generator includes a secondary winding which energizes the winding 69. This secondary winding (not shown) is inductively related by a rotor to a primary winding (not shown) of the velocity generator which is connected to the ship's A. C. supply. The velocity generator may be of the type disclosed in the application of John F. Schoeppel et al., Serial No. 526,806, now Patent 2,524,998. The function of the velocity generator 71 is to limit the speed of rotation of the motor 61 in proportion to the value of the signal from the rate turn potentiometers 74.

The amplifier 62 may control the motor 61 to effect selected changes in heading of the craft. During these changes in heading the motor 61 rotates at a constant speed to provide a constant rate of turn of the craft during heading changes of this character. The amplifier 62 during such selected changes in heading includes in its input control circuit, in the other instance, the secondary winding 68 of transformer 67, switch arm 96, the H contact of switch 70, an A. C. bridge 80 constituting a fixed source of voltage, bridge ground lead 141, and amplifier ground lead 64. The phase of the voltage from the bridge 80 is controlled by relays operated from an amplifier 91.

The bridge 80 consists of a transformer 81 having a primary winding 82 connected to the ship's A. C. supply and a secondary winding 83 which has one end connected to one relay contact 85 and which has its other end connected through a variable resistor 84 to a second relay contact 86. The relay contacts 85 and 86 are shunted by a center tapped resistor 87. Between the contacts 85 and 86 is a coacting single-pole double-throw relay arm 88 which in normal position engages neither of contacts 85 or 86.

The arm 88 is alternatively operated by relay coils 89 and 90 which are operated from amplifier 91. Amplifier 91 is the A. C. discriminator type having A. C. control signal input leads 92 and 93 and A. C. power input leads 94, 95 connected to the ship's supply. One or the other of relays 89, 90 is operated depending upon the phase relation between the voltage across signal input leads 92 and 93 and the voltage across the power input leads 94, 95.

The input leads 92, 93 are connected to a single-phase winding 99 of a synchro transformer 98. The synchro transformer 98 includes a stator 100 having three phase windings which are connected to the heading change (H) contacts of the three pole three position switch 102. The switch 102 additionally has warm up (W) contacts and a rate of turn (R) contacts. The (W) and (R) contacts may be connected together. The three switch arms 104 of the switch 102 are associated with the three-phase windings of a stator 106 which constitutes part of a synchro generator-receiver 107. The generator 107 includes a single-phase winding 108 which is connected to the ship's supply of alternating current. The single-phase winding 108 may be manually adjusted by a heading selector knob 110 connected thereto.

The windings of stator 106 are also connected to the corresponding windings of a stator 111 of a synchro receiver or follower 112. The synchro 112 includes a single-phase winding 113 which is connected to the ship's supply of alternating current. The winding 113 is operatively connected to a double pointer 114 to position the same over a dial 115 carrying suitable indicia (not shown). The double pointer 114 is positioned in accordance with the called for change in heading as determined by the movement given to heading selector knob 110 or is positioned at a rate determined by the movement given to rate turn knob 77.

The stator winding 106 of the generator-follower 107 and the stator winding 111 of the synchro receiver 112 are selectively associated through the R contacts of switch 102 with the stator winding 116 of a synchro generator 118. The synchro generator 118 includes a single-phase winding 117 which is connected to the ship's supply of alternating current. This single-phase winding 117 is carried by the shaft 60 driven by the motor 61 which also carries the single-phase winding 99 of the synchro transformer 98. The stator winding 116 of generator 118 and the stator winding 100 of the signal transformer 98 are carried by a shaft 120. The shaft 120 is driven from the auxiliary motor 52 by a suitable mechanical drive such as a driving sprocket 121 carried by the motor shaft 57, a driven sprocket carried by the shaft 120 and a chain 122 operatively associating the sprocket 121 with the driven sprocket 123.

*The operation of the structure of Figure 1*

The operating may begin with a consideration of the step of "warming up" the automatic pilot.

During the "warm up" step, the differentiating means 42 is placed into an ineffective or no signal condition and the pick-off 15 for controlling automatic stabilization of the craft has any relative angular displacement of its two parts 16 and 17 removed without appreciably altering the craft heading or gyroscope position. As a preliminary to the warm up operation the common actuator 109 for the switch arm 96 of switch 70 and the switch arms 104 of switch 102 is operated to bring the switch arm 96 and the switch arms 104 into engagement with the (W) contacts. Further, the common actuator 126 for the switch arms 124 and 125 of switch 26 is operated so these switch arms engage their lower contacts shown which is termed the "no compass position." The manually operable knob 77 of the rate turn selector is in the normal position with the slider 75 adjacent the center tap of resistor 76.

The general case will be considered in which the compass 40, the gyro 18, and the craft are all out of alignment with respect to one another.

Since the craft is not aligned with the gyroscope the slider 17 will not be at the center tap of the resistor 16 so that there will be a voltage across the slider and center tap. This voltage is supplied by the slider 17, lead 127, lead 128, contact (W) of switch 70, switch arm 96, lead 129, transformer secondary winding 68, lead 63, to amplifier 62 where it may be connected to one control electrode of the amplifier, the other control electrode may be connected by lead 64 to ground which is common to the ground lead 132 of center tapped resistor 16. The amplifier 62 causes the motor 61 to rotate which through its shaft 60 and driving gear 59 rotates the driven gear 58 which carries the resistor 16 until the center tap of the resistor is adjacent the slider 17 when no control signal is available.

The motor 61 through its shaft 60 also positions the single-phase winding 99 of synchro transformer 98 and the single-phase winding 117 of synchro generator 118. The stator winding 116 of the synchro generator 118 is now associated through the (W) contacts of switch 102 and switch arms 104, lead 130, with the stator windings 106 and 111 of the synchro follower-generator 107 and the synchro follower 112. The synchro generator 118 therefore causes the follower-generator 107 and the follower 112 to assume such positions between their stator windings and the single-phase windings as exists in the generator 118 between its stator winding 116 and its single-phase winding or rotor winding 117 and thus makes them conform to the heading of the craft relative to the gyroscope 18 in a manner to be described.

With the gyro 18 however out of alignment with the compass 40 so that there is a signal in the differential means 42, a signal is generated in the single-phase winding 34 of the signal transformer 35. This signal is applied to the discriminator amplifier 27 which upon operation applies a control voltage through the switch 26 to the stator windings 53, 54 of the motor 52. The motor 52 through its shaft 57 rotates the stator 36 of signal transformer 35 until there is no signal generated in the single-phase winding 34. The motor 52 also through its chain and sprocket drive rotates the stators 116 and 100 of a generator 118 and the signal transformer 98. The synchros 107 and 112 further assume a position corresponding to that of synchro generator 118 and now makes them conform to the heading of the craft relative to the compass in a manner to be described.

At the beginning of the warm up operation we had stated that the craft and gyro were not aligned, consequently the gyroscope stabilized single-phase winding or rotor 45 of synchro generator 44 will be displaced with respect to the stator winding 46 and this relative displacement will be reflected in the movement of the rotor 49 of the follower 48 whereby the pointer 50 will be moved in accordance with the difference between the heading of the gyro and that of the craft. Furthermore since it was pointed out that the compass and gyro had been relatively angularly displaced, the motor 52 will have rotated the stator 46 with respect to the gyro stabilized rotor winding 45 of synchro generator 44 this angular amount. This movement of the stator 46 with respect to the rotor 45 will be reflected by an additional movement of the rotor 49 of the synchro receiver or follower 48 resulting in additional movement of the pointer 50 with respect to the dial 51. The pointer 50 will indicate the magnetic heading of the craft and agree with the reading of the indicator 114.

By means of the motor 61 we have rotated the rotor winding 99 of signal transformer 98 and the winding 117 of generator 118 with respect to the craft an angular amount equal to the angular displacement of the gyro stabilized rotor winding 45 with respect to the relatively fixed stator winding 46. Additionally we have rotated through the motor 52 the stator windings 116 and 100 of synchro generator 118 and signal transformer 98 an amount equal to the angular displacement given to the stator winding 46, thus the relative angular displacement of the single-phase winding 117 of the synchro generator 118 with respect to its stator winding 116 is the same as that between the winding 45 of generator 44 with respect to its stator winding 46. Since the synchro follower-generator 107 and the synchro follower 112 assume positions corresponding to that of the synchro generator 118 it is evident that the double pointer 114 has assumed a position with respect to its dial 115 which corresponds to that assumed by the pointer 50 with respect to its dial 51. Thus after the warm up operation the pointers 114 and 50 coincide in direction.

After the warm up as described has permitted the placing of the differential means 42 in a no signal or ineffective condition, the double-pole double-throw switch 26 is operated so that the contact arms 124, 125 engage their upper contacts shown at which time the precession motor or torque applying means 25 of the gyro 18 is associated through the multiple lead 135 with the leads 138, 139 of the amplifier 27. Subsequently should the gyro tend to wander thereby rotating the single-phase winding 34 with respect to its stator winding 36, the relative positions of the single-phase windings 34 and 39 of the synchro transformer 35 and synchro generator 37 with respect to their stator windings 36 and 38 is upset thereby generating a signal in the single-phase winding 34 which is applied to the amplifier 27. The amplifier 27 operates and causes the torque applying means 25 to exert a torque about the horizontal axis of the trunnions 20 thereby causing the gyro to precess about the axis of trunnions 22 until the single-phase winding 34 is again brought into the position of correspondence with its stator winding 36 compared to the position of winding 39 of synchro generator 37 with respect to its stator winding 38. The precession rate of the torque applying means 25 is so low that slight oscillations of the magnetic compass 40 do not affect the position of the gyroscope 18.

For automatic stabilized flight from the directional gyroscope 18 the switch arms 96 and 104 are adjusted until they engage the H or R contacts. Should a transient disturbance be applied to the craft such as that resulting from a wind gust, the craft supported resistor 16 may be rotated with respect to the gyro stabilized slider 17 of pick-off 15 whereby a difference in voltage exists between the slider 17 and a center tap of resistor 16. This voltage is applied by slider 17, lead 127, through a rebalancing potentiometer or other portion of a network 14 and thence to a control electrode of amplifier 14. The other control electrode of the amplifier may be connected by lead wire 133 to ground which is common to the ground of lead wire 132 extending from the center tap of resistor 16.

The amplifier in the autopilot network operates the rudder servomotor 13 which through the cables 10 adjusts the rudder to correct for the transient disturbance. The motor 13 through a follow up arrangement 24 operates a follow up potentiometer in the arrangement 14 to rebalance the network in the amplifier. As the craft returns toward its course, the relative displacement of the slider 17 and resistor 16 decreases resulting in opposite unbalance of the amplifier input circuit from the rebalance potentiometer within the arrangement 14 resulting in a return of the rudder toward its normal position. When the craft has regained its course, the rudder is returned to normal position and the deviation due to the transient disturbance is thus corrected.

When change in heading of selected angular amounts is desired, the switch arms 96 and 104 are moved so that they engage the H contacts. The knob 110 may be manually rotated in accordance with the desired magnitude and direction of change in heading to be made. This adjustment of the knob 110 moves the rotor 108 of the synchro generator 107 with respect to its stator 106 causing a current to flow between the stator winding 106 of generator 107 and the stator winding 111 of the synchro receiver 112. The rotor winding 113 is automatically rotated until it assumes a position of correspondence with respect to its stator winding 111 as exists between the rotor winding 108 and stator winding 106 of generator 107. The movement of the rotor 113 is applied to the indicator 114 in accordance with the call for change in heading.

The synchro generator 107 through its stator winding 106 and the H contacts of switch 102 causes a control signal to be induced in the single-phase or rotor winding 99 of the synchro transformer 98. This signal is applied to the amplifier 91 which energizes one or the other of relay operating coils 89, 90. The operated relay coil moves the relay arm 88 into engagement with one or the other of contacts 85, 86 whereby the potential difference between one end of resistor 87 and its grounded center tap is also applied through the arm 88, lead 140, H contact of switch 70, switch arm 96, lead 129, transformer secondary winding 68, lead 63, to a control electrode of amplifier 62 whose other control electrode may be connected by lead wire 64 to ground and return thence through the ground lead wire 141 to the center tap of resistor 87.

The amplifier 62 causes the motor 61 to operate which rotates the driving gear 59 and the driven gear 58 to position the resistor 16 with respect to the gyro stabilized slider 17 of pick-off 15 and also rotates the single-phase winding 99 of the synchro transformer 98 and the single-phase winding 117 of synchro generator 118 until the transformer 98 is in a no signal position. Thus the amount of rotation of motor 61 is determined by the amount of adjustment given to the heading selector knob 110. The windings of synchros 112 and 118 are in corresponding positions.

The displacement of the resistor 16 with respect to the slider 17 causes a signal to be applied to the network and amplifier arrangement 14 resulting in the operation of the servomotor 13 and the adjustment of the rudder. This adjustment of the rudder causes the craft to change heading. As the craft changes heading the resistor 16 which may now be considered fixed to the craft, in the absence of rotation of motor 61, rotates in an opposite direction from that obtained by the rotation of motor 61; and the resistor 16 due to the rotation of the craft is moved so that its center tap is realigned with the gyro stabilized slider 17. As this signal is reduced the amount of rudder displacement decreases until when the craft has changed its heading by the amount called for the rudder is again in normal position.

As the craft changes heading, the gyroscope associated stator windings 46, 36, and compass associated winding 38 are regularly displaced with respect to their rotor windings 45, 34, and 39 but these angular displacements are equal. Since the angular displacements are equal the differentiating means 42 is maintained in an ineffective or no signal condition. The movement of stator 46 with respect to its rotor winding 45 causes a circulating current to be transmitted to the stator winding 47 of the synchro receiver 48. The stator winding 47 reacts on the rotor winding 49 to rotate the same until it assumes a position of correspondence with that of winding 45. The pointer 50 being operated by the rotor winding 49 shows the change in heading of the craft. It therefore again indicates the magnetic heading of the craft.

During variable selected rate turns, the switch arms 96 and 104 are rotated to engage their respective (R) contacts. The knob 77 may be manually adjusted to set up a desired rate of turn whereby a difference of potential will be set up between the slider 75 and the center tap of resistor 76. This potential is transmitted by means of slider 75, lead 101, R contact of switch 70, switch arm 96, lead 129, secondary winding 68, lead 63, to one control electrode in amplifier 62 whose other control electrode is connected by ground lead 64 and ground lead 142 to the center tap of resistor 76. The motor 61 is controlled by the amplifier 62 and the energization of its amplifier phase winding is modulated in proportion to the value of rate turn selected. Any tendency of the motor to increase above the speed in proportion to the selected rate results in such voltage being generated in the velocity generator 71 which tends to decrease the signal voltage on amplifier 62 thus reducing the energization of the amplifier phase winding.

The motor 61 drives the resistor 16 of potentiometer 15 with respect to the stabilized slider 17 and rotates the single-phase windings 99 and 117 of the synchro transformer 98 and the synchro generator 118. The synchro generator 118 through the R contacts of switch 102 and switch arms 104, lead 130 causes the synchros 107 and 112 to follow the movements of the generator 118.

The relative displacement of the slider 17 and resistor 16 results in a signal being applied to the network and amplifier arrangement 14 which positions the rudder to effect change in heading at the selected rate. The servomotor 13 through its follow up drive 24 rebalances the network in the arrangement 14. The rotation of the craft due to the applied rudder causes the stator windings 46, 36, and 38 to rotate with respect to their rotors 45, 34, and 39, this angular relative displacement being reflected by the rate of rotation of the single-phase winding 49 of the synchro receiver 48 with the adjustment of the pointer 50 to show the continuous change in heading of the craft.

The pointer 114 now assumes a rate of change of position corresponding with the called for rate of change of the craft whereas the pointer 15 assumes a position corresponding with the actual rate of change thereof.

When the rate of turn is to be discontinued, the knob 77 is moved back to its center position and the input circuit of amplifier 62 is no longer unbalanced. The amplifier 62 no longer energizes motor 61 which ceases to rotate. Since the called for position of the craft does not coincide with the actual position of the craft but is greater, the resistor 16 will be displaced angularly with respect to the slider 17 upon stoppage of the motor 61. As the displaced rudder causes continued angular movement of the craft the relative displacement of the resistor 16 and slider 17 decreases resulting in an opposite unbalance of the network and the amplifier in the arrangement 14 with the result that the rudder servomotor is moved in an opposite direction to return the rudder toward normal position. When the parts 16 and 17 of the pick-off 15 are in no signal position the craft will be steadied on its new heading. The indicators 114 and 50 will be pointed in a corresponding direction indicating that the craft has reached the called for position.

If it be desired, the craft may be also stabilized by the gyroscope alone rather than as previously considered from the compass slaved gyroscope thus the gyroscope will now be unslaved. During this operation when the gyroscope 18 is not slaved to the compass 40 the switch 26 is operated so that its arms 124, 125 engage the lower contact shown in Figure 1. If the unslaved gyro has a tendency to wander, the slider 17 will be moved with respect to the resistor 16 resulting in a change in heading of the craft until the slider 17 is again at the center tap of resistor 16. In other words the ship has undergone an angular displacement equal to that of the wander of the gyro. The gyroscope stabilized rotor 45 in effect will not have rotated with respect to its stator 46 and the rotor 34 will not have rotated with respect to its stator 36 due to the wander of the gyro and the change in heading of the craft. However, the change in heading of the craft causes a relative rotation of the stator 38 with respect to its rotor 39 stabilized by the compass 40. The differential means 42 will have the rotor winding 39 out of position of correspondence with respect to its stator 38 as compared to the position of rotor 34 with respect to its stator 36 resulting in a signal being set up in the winding 34 of signal transformer 35. The signal in the single-phase winding 34 operates the amplifier 27 which through the switch 26 operates the motor 52. The motor 52 rotates the stator windings 36 and 46 until there is no signal generated in the single-phase winding 34. Simultaneously the motor 52 adjusts the stator windings 116 and 100 of the synchro generator 118 and the synchro transformer 98. The movement of stator 46 with respect to its rotor 45 causes the synchro follower 48 to rotate its rotor winding 49 and pointer 50 in accordance with the angular deviation of the gyro and the craft with respect to the original magnetic heading and therefore the pointer 50 will indicate the new magnetic heading of the craft. During this "no compass" operation the switch arm 104 will engage the (R) contacts and thus cause the synchro follower-generator 107 and the synchro follower 112 to follow the movements of the signal generator 118 as operated from the motor 52. The pointers 114 and 50 are thus maintained in alignment during the no compass control of the gyro while the gyro stabilizes the craft.

While there is shown in Figure 1 an arrangement whereby the stator winding 36 of the synchro transformer 35 is physically rotated so that no signal voltage is generated in the rotor winding 34, it is possible to prevent the generator of a signal in rotor winding 34 or to reduce it to zero by the provision of an arrangement as shown in Figure 2. In Figure 2 a synchro differential 145 has been placed between the stator 38 and the stator 36 of the generator 37 and the synchro transformer 35. The rotors 39 and 34 are indicated as in Figure 1. The stator winding 38 of the generator 37 is connected to a three winding stator 144 of synchro differential 145. The stator winding 36 of synchro transformer 35 is connected to the three winding rotor 146 of the differential 145. The differential means 42 thus contains a synchro generator, a synchro differential, and a synchro transformer 35. The rotor winding 146 of the differential synchro 145 is driven by the motor 52 through its operating shaft 57. Thus during the warm up operation or during automatic flight while the gyro is under no compass, a signal generated in rotor winding 34 of synchro transformer 35 due to relative angular movement of the gyro and compass will result in the operation of the amplifier 27 and the motor 52 which will position the winding 146 until no signal is induced in the winding 34. This arrangement of including a synchro differential in the differential means 42 may be desirable for convenience where the stator 36 may be somewhat inaccessible and not readily driven from the motor 52. With the inclusion of a synchro differential between the stator windings 36 and 38 it is also necessary to include a synchro differential between the stator windings 46 and 47 of synchro generator 44 and synchro receiver 48. In such case the shaft 57 of motor 52 would position a corresponding rotor of the synchro differential corresponding with rotor 146 of differential 145. Furthermore, a synchro differential would be interposed the stator winding 116 of generator 118 and the stators 106, 111 of synchro 107 and synchro follower 112 and another synchro differential would be interposed the stator winding 100 of synchro transformer 98 and the stator winding 106 of signal generator-motor 107. The shaft 120 instead of driving the stator windings 100 and 116 will drive a three-phase rotor winding in each of the two additional synchro differentials. It is considered that the application of the three additional synchro differentials is obvious from the detailed description of the application of the one synchro differential between the stator winding 38 of generator 37 and the stator winding 36 of the signal transformer 35.

From the above it will be understood that a novel apparatus has been provided wherein a gyroscope which controls an automatic pilot for a craft may be slaved to a magnetic compass which exercises supervision over the gyroscope through an arrangement which is properly conditioned before the slaved arrangement between the compass and gyro is imposed. This apparatus furthermore includes means for indicating at all times the magnetic heading of the craft even though the gyro itself may not be slaved to the compass.

While there have been illustrated some preferred embodiments of the invention, yet it is desired not to limit the invention to the specific features shown.

What is claimed is:

1. In combination: a directional gyroscope; a direction sensitive instrument; precessing means for altering the direction of said gyroscope; a differential means having a plurality of movable parts, one part controlled by said gyroscope and a second part controlled by said instrument, said differential means being effective upon misalignment of said instrument and gyroscope indicative by relative movement of said parts for exerting a control effect; operating means responsive to said control effect and energizing said gyroscope precessing means to slowly remove said misalignment and thus remove said control effect; motor means having a relatively movable element thereof for also controlling a part of said differential means to affect said control effect; and means for alternatively connecting said operating means with said motor means to more rapidly place said differential means in a condition where the control effect is removed.

2. Control apparatus for an aircraft comprising: a directional gyroscope; a two part pick-off responsive to relative angular movement about a vertical axis of said gyroscope and craft; means controlled by said pick-off for positioning said craft to restore said craft and gyroscope to original angular alignment; a compass responsive to the magnetic field of the earth; differential means having first and second rotatable members operated by said gyroscope and compass and effective on relative angular displacement of said compass and gyroscope for rendering a control effect; a first means for aligning said gyroscope and compass to remove said relative angular displacement of said members to remove the control effect; a second means also operating a third rotatable member in said differential means for alternatively removing said control effect; and means for selectively controlling either the first or second means in accordance with the control effect from said differential means.

3. The apparatus of claim 2, with means for removing any relative angular displacement of said pick-off parts while said second means is controlled by said differential means.

4. The apparatus of claim 3, with means positioned with said differential means for indicating the magnetic heading of said craft.

5. Control apparatus for a dirigible craft having a control surface for controlling its heading, said apparatus comprising: a directional gyroscope; a two part pick-off responsive to relative angular displacement of said craft and gyroscope; means controlled by said pick-off for positioning said control surface to realign said gyroscope and craft; a magnetic compass; differential means having a plurality of angularly displaceable parts, one part operated by said gyroscope and another part by said compass, said differential means being effective to generate a signal in response to relative angular displacement of said compass and gyroscope; motor means adapted to angularly displace another part in said differential means and controlled by said signal from said differential means thereby introducing a compensating angular displacement in said differential means to oppose said response of said differential means to said relative angular displacement of said gyroscope and compass; a craft heading changer comprising a synchro generator; a motor for positioning one part of said two part pick-off; a synchro transformer connectible with said synchro generator and generating an electric voltage upon relative misalignment of its parts with those of said synchro generator; means for differentially positioning said synchro transformer parts from said motor means and said motor; means responsive to the resultant voltage signal due to relative misalignment of the parts of said synchro generator and said synchro transformer for controlling said motor, whereby during operation of said motor means the motor maintains said pick-off and said synchro transformer in a null condition in each instance.

6. Control apparatus for a dirigible craft having a control surface for controlling its heading comprising: a directional gyroscope; a two part pick-off responsive to relative angular displacement of said craft and gyroscope; means controlled by said pick-off for positioning said control surface; a magnetic compass; differential means operated by said gyroscope and compass and effective to generate a signal in response to relative angular displacement of said compass and gyroscope; motor means controlled by said signal for rendering said differential means ineffective by introducing a compensating angular displacement thus opposing said response of said differential means to said relative angular displacement, a course changer comprising a synchro generator, a motor for positioning one part of said pick-off; a synchro transformer connectible with said synchro generator and differentially positioned by said motor means and said motor; means responsive to a resultant signal due to relative movements of said synchro generator and synchro transformer for controlling said motor, whereby during operation of said motor means the motor maintains said pick-off and said synchro transformer in a null condition; a second synchro generator having one part positioned by said motor and a second part positioned by said motor means and selective means for disconnecting said first synchro generator and synchro transformer and connecting the two synchro generators for positioning the first synchro generator from said second synchro generator and for controlling said motor from said pick-off during operation of said motor means; with alternative selective means including a manually adjustable variable voltage generator connected to the motor for controlling said motor at selected rates the selective means disassociating said motor from both said pick-off and said synchro transformer.

7. Control apparatus for a dirigible craft having a control surface for altering the heading of said craft, said apparatus comprising: a directional gyroscope; a two part pick-off responsive to relative angular displacement of said craft and gyroscope; means controlled by said pick-off for operating said control surface to realign said craft and gyroscope; a magnetic compass; balanceable differential means responsive to angular movement of said compass and gyroscope and developing a control effect due to unbalance thereof caused by relative movement of the gyroscope and compass; gyroscope precessing means; auxiliary motor means having a movable member thereof operatively connected with said differential means and applying a movement thereto to rebalance the differential means for compensating for the relative angular movement of said compass and gyroscope and thus affecting said control effect; switch means for alternatively operating said precessing or auxiliary motor means in accordance with said control effect from said differential means; and means positioned by said gyroscope and auxiliary motor means for indicating the magnetic heading of said dirigible craft.

8. The apparatus of claim 7, with means for adjusting one pick-off part to change heading of said craft.

9. The apparatus of claim 8, wherein the means to adjust one pick-off comprises a motor for positioning said pick-off part and means for controlling rotation of said motor.

10. The apparatus of claim 9, wherein the means for controlling the motor includes means for operating said motor a predetermined extent or at a predetermined rate.

11. Control apparatus for a dirigible craft having a control surface for altering its heading, said apparatus comprising: a directional gyroscope; a two part pick-off responsive to relative angular displacement of said craft and gyroscope; means controlled by said pick-off for operating said control surface to realign said craft and gyroscope; a magnetic compass; balanceable alternating voltage generating differential means responsive to relative angular movement of said compass and gyroscope and developing a control voltage during the existence of such relative movement; alternating voltage operated gyroscope precessing means; auxiliary alternating voltage, motor means having a movable member operatively connected with said differential means for supplying thereto a movement that compensates for the relative angular movement of said compass and gyroscope to remove said control effect; switch means for alternatively operating said precessing or auxiliary motor means in accordance with said control effect from said differential means; means positioned by said gyroscope and auxiliary motor for indicating magnetic heading of said craft; means for positioning one part of said pick-off comprising a synchro generator, a motor operatively connected with said pick-off, a synchro transformer and a second synchro generator each having a part driven by said motor and a part adapted to be driven by said auxiliary motor means; and second switch means having a first position for controlling said motor from the first synchro generator and the synchro transformer to effect a selected angular change of course and a second position for severally controlling said motor from said pick-off, connecting said first synchro generator and second synchro generator to position the former from said second synchro generator to compensate the first synchro generator for the driving of the synchro transformer by the motor, and disconnecting said first synchro generator from the synchro transformer.

12. Control apparatus for an aircraft comprising: a directional gyroscope comprising a gyro rotor bearing casing mounted in a gimbal for rotation about vertical and horizontal gyro axes; a torque motor for precessing said gyro about the vertical axis; means for controlling the direction of flight of said aircraft from said gyroscope; a magnetic compass, differential means including a stabilized gyro part, a stabilized compass part, and a part carried by said craft but movable relative thereto for operating said torque motor upon relative movement of said compass and gyroscope; an alternative means operated by said differential means upon relative movement of said compass and gyroscope and means positioned by said alternative means and moving said craft carried part for compensating said differential means for the relative movement of said gyroscope and compass.

13. In combination a directional gyroscope having a gyro rotor casing mounted for oscillation about a horizontal axis in a vertical gimbal ring which in turn is rotatable about a vertical axis; precession means mounted on said gyroscope for rotating said gyro rotor about said vertical axis; a synchro control transformer having one winding carried on said vertical axis and a second winding rotatable with respect to its support; a synchro transmitter having two windings one of which is connected to one winding of said control transformer; means for operating the other winding of said transmitter in accordance with the magnetic heading; means for operating said precession means from the secondary winding of the control transformer whereby said transformer windings are relatively rotated and thus brought to a null position; and alternative motor means having a stationary and a movable part controlled from said control transformer with the movable part connected for rotating the other rotatable part of said control transformer for also placing said control transformer in a null position.

14. Control apparatus for a dirigible craft having a control surface for altering its heading, said apparatus comprising: a directional gyroscope; a two part pick-off responsive to relative angular displacement of said craft and gyroscope; means controlled by said pick-off for positioning said control surface to alter the heading of said craft; a magnetic compass; differential means operated by said gyroscope and by said compass and effective on misalignment thereof to generate a signal; motor means connected to the differential means and controlled by said signal and operatively connected to said differential means and providing an operation thereof compensating for the operation of said differential means due to the relative angular displacement of said compass and gyroscope; a craft course changer comprising a manually operable synchro generator, a motor for positioning one part of said pick-off and a synchro transformer connectible with said synchro generator and controlling the motor and differentially positioned by said motor means and said motor; means responsive to a resultant signal due to relative movement of said manually operable synchro generator and said synchro transformer for controlling said motor, whereby during operation of said motor means the motor maintains said pick-off and said synchro transformer in a null condition in each instance, whereby drift of the gyroscope does not result in drift of craft heading; a second synchro generator having one part positioned by said motor and a second part positioned by said motor means and selective means for disconnecting said first synchro generator and synchro transformer and connecting the first synchro generator and said second synchro generator whereby said first manually operable synchro generator may be positioned from said second generator; means for additionally controlling said motor from said pick-off, whereby during subsequent operation of said motor means, said pick-off is maintained at a null condition, and said first synchro generator is positioned by said second synchro generator to compensate for any relative rotation of the two parts of said synchro transformer.

15. The apparatus of claim 11, with selected means for controlling the speed of the motor including a third position of said second switch means wherein said motor is disconnected from said pick-off but with the first and second synchro generators connected to form a motor-generator arrangement with the first synchro functioning as a motor.

References Cited in the file of this patent

UNITED STATES PATENTS

| | | |
|---|---|---|
| 2,126,935 | Manteuffel | Aug. 16, 1938 |
| 2,346,849 | Lear | Apr. 18, 1944 |
| 2,450,907 | Newton et al. | Oct. 12, 1948 |
| 2,524,756 | Bradden et al. | Oct. 10, 1950 |
| 2,539,411 | Esval et al. | Jan. 30, 1951 |

FOREIGN PATENTS

| | | |
|---|---|---|
| 49,251 | France | Nov. 12, 1938 |
| | (Addition to Pat. No. 793,301) | |